United States Patent [19]

Pathë et al.

[11] Patent Number: 4,585,713
[45] Date of Patent: Apr. 29, 1986

[54] ELECTRICAL DEVICE COMPRISING AT LEAST ONE THERMAL BATTERY AND ITS APPLICATION TO A MODULABLE POWER GENERATOR

[75] Inventors: Claude Pathë, Chatillon; Jean Darmois, Bourg-La-Reine; Claude Nëe, Antony, all of France

[73] Assignee: Societe Nationale Industrielle Aerospatiale, Paris, France

[21] Appl. No.: 671,440

[22] Filed: Nov. 14, 1984

[30] Foreign Application Priority Data

Nov. 16, 1983 [FR] France .................. 83 18206

[51] Int. Cl.[4] ........................... H01M 6/36
[52] U.S. Cl. ..................... 429/112; 307/86; 307/117; 320/36
[58] Field of Search ............. 429/112, 52; 320/33, 320/34, 35, 36, 30; 307/71, 77, 86; 335/141; 337/14, 298

[56] References Cited

U.S. PATENT DOCUMENTS

| | | | |
|---|---|---|---|
| 3,516,868 | 6/1970 | Nee et al. | 429/112 X |
| 3,625,767 | 12/1971 | Clark et al. | 429/112 |
| 3,639,773 | 2/1972 | Ayd et al. | 429/112 |
| 4,156,057 | 5/1979 | Zelhoefer | 429/112 |

*Primary Examiner*—Anthony Skapars
*Attorney, Agent, or Firm*—Fisher, Christen & Sabol

[57] ABSTRACT

The invention relates to an electrical device including at least one thermal battery, in which the electrolyte, which is normally inactivated, has to be activated by an activator, and whose temporary operation is coupled with a release of heat which subjects the elements of the battery to an increase in temperature such that to a specific temperature of said elements corresponds a predetermined moment in the operation of said battery.

The device includes at least one thermal switch which is thermally connected with an element belonging to said battery, and which is designed to work at a predetermined temperature varying within the range of temperatures taken on by said element during operation of the battery.

The invention finds an application in watching devices.

6 Claims, 1 Drawing Figure

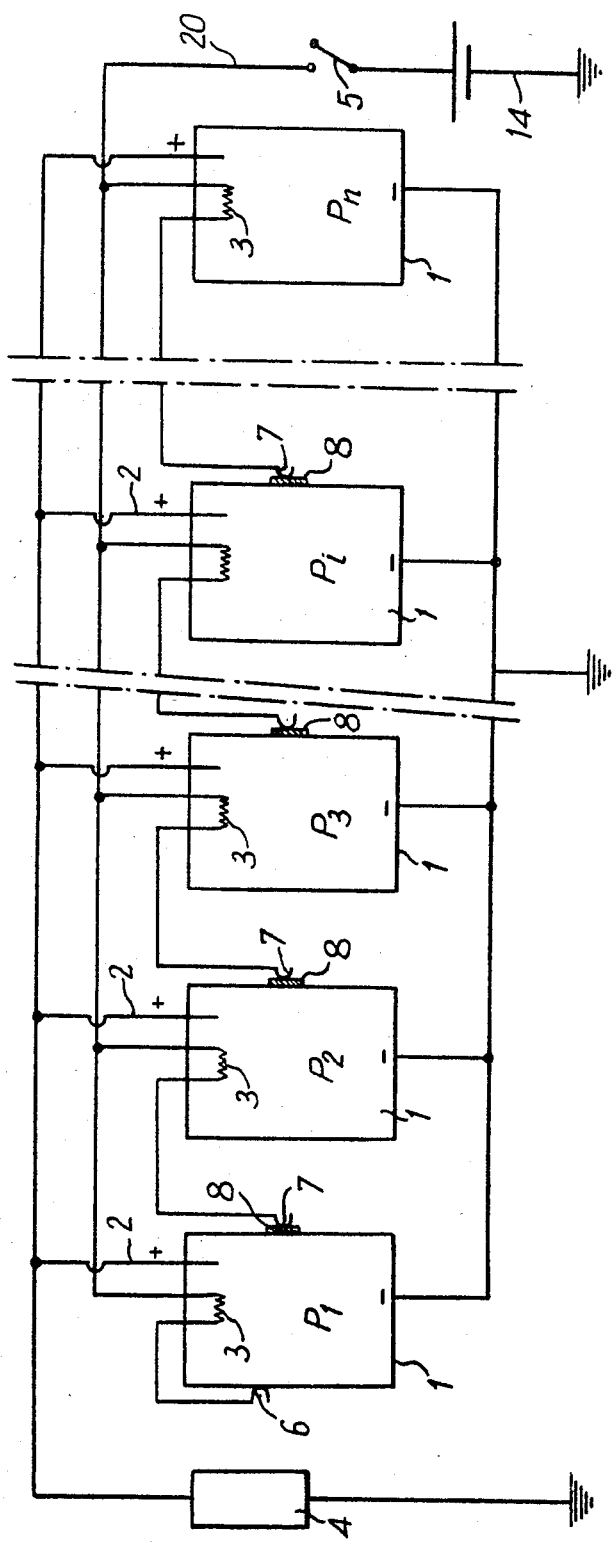

ELECTRICAL DEVICE COMPRISING AT LEAST ONE THERMAL BATTERY AND ITS APPLICATION TO A MODULABLE POWER GENERATOR

The present invention relates to an electrical device comprising at least one thermal battery and to its application to a modulable electric power generator.

Non-reusable thermal batteries of short operational life are already known, in which the electrolyte is normally inactivated and requires to be activated by means of an activator. Said electrolyte is for example constituted by a meltable mineral salt which is in solid form and electrically inactivated at ambient temperature, but which becomes electrically active when melted by the activator, which latter then is a pyrotechnically initiated ignitor.

These thermal batteries have a number of interesting features which are linked in particular to the fact that before they are activated, the electrolyte is electrically neutral and solid:

their life-duration, in storage before activation, is at least equal to twenty years, if not more;

they require no maintenance and their leakproofness is perfect;

they can withstand severe environment conditions and can be activated at any moment in virtually any type of conditions. They can accept ambient temperature conditions varying between $-50°$ C. and $+70°$ C.;

they show very high impedance before and after operation.

The aforesaid advantageous properties should destine said thermal batteries more particularly for supplying watching, alarm and safety devices, and the like, especially as, even when these batteries are connected to their utilization circuit, they do not discharge spontaneously, but on the contrary, they have to be activated to do so.

Yet, such an application has been up to now impossible because of the essentially temporary operation of the batteries after their activation.

It is the object of the present invention to overcome this by proposing an electric power generator composed of thermal batteries and adapted to deliver time-modulable electrical energy. It therefore bacomes possible with the present invention, to eliminate the defects of dry-cell batteries and of accumulators, defects particularly related to their delicate maintenance, to their short operational life, their uncertain leakproofness and poor resistance to severe environment conditions.

The present invention is based on the finding that these thermal batteries are, during their operation, the center of a release of heat which subjects their elements and in particular their casing, to a continuous increase of temperature, such that to a temperature of said elements corresponds a particular working moment of the battery, namely an internal condition of the latter. For example, the temperature of the casing of such a thermal battery placed in ambient temperature increases linearly from that ambient temperature, at activation time, to a maximum temperature (generally between 150° and 300° C.) reached at end of operation.

To exploit this property to advantage, the present invention proposes an electric device which comprises at least one thermal battery in which the electrolyte, which is normally inactivated, has to be activated by way of an activator, and whose temporary operation is coupled with a release of heat subjecting some of the elements of the battery to a temperature increase such that to a specific temperature of said elements corresponds a predetermined working moment of said battery, device characterized in that it comprises at least one thermal switch which is thermally connected with an element belonging to the battery or having a connection therewith and which is designed to work at a predetermined temperature, varying within the range of temperatures taken on by said element during the operation of the battery.

The said thermal switch can thus control an electrical circuit as soon as the battery reaches a predetermined working state.

Preferably, said thermal switch is mounted on the casing of the battery and is thermally connected with the latter. It is then advantageous for said casing to be at least partly electrically conducting and to form part of the electrical circuit controlled by said switch.

According to a special embodiment of the invention, the switch can then comprise a conducting movable arm, of the spring type for example, pressed in towards the casing of said battery, but separated therefrom by an insulating material capable, either to be eliminated by melting, or to become conducting in response to the temperature increase of the portion of casing with which it is in contact.

Obviously, to prevent any operational faults when the battery is activated, it is necessary to use insulating materials for which the softening, melting or conducting temperature not only corresponds to the temperature of the battery with which the controlled electrical circuit is designed to be actuated, but also exceeds the maximum temperature of the environment in which the battery is situated before being activated.

The following insulating substances are given by way of example as being usable, depending on the temperature applied thereto:

up to 70° C.: paraffins, stearin
between 70° C. and 100° C.: polyethylene
between 100° C. and 160° C.: polyurethane
between 160° C. and 210° C.: anthracenes
between 210° C. and 240° C.: polycarbonates
between 240° C. and 270° C.: polyoxyphenylenes.

The thermal switch, the element of the battery to which it is connected, the connection between said element and said switch, the position of said switch on said element, etc . . . , may all be chosen so that said switch is actuated immediately the battery is activated, and during the operation thereof, or else after said operation.

It is also possible for a plurality of thermal switches to be associated to said battery for the purpose of controlling a plurality of electrical circuits and/or signal-delivering circuits, at different moments through the operation of the battery.

Said thermal switch or switches controlled by heating of the battery can also be provided in the circuit controlling the activator of another thermal battery. Thus the two thermal batteries can be selectively made to work either simultaneously, or with partial or complete overlapping operation, or in succession.

In a more general way, to obtain a continuous generator according to the invention, a plurality of thermal batteries of the afore-described type are provided, each one being associated to at least one thermal switch in order to be able to control at least one of said other batteries.

Due to the fact that, before and after operation, said batteries have a very high impedance and no power discharge, the batteries from said plurality of batteries may be mounted in parallel and stacked on the same utilization device without the need of a switch. Accordingly, the resulting generator is constituted of a series of thermal batteries which are arranged in parallel on the apparatus to be supplied and the activator of each one of which is controlled by the switch associated to the preceding thermal pile of the series, with the exception of the first which is directly and deliberately controlled by an operator.

The invention will be more readily understood on reading the following description, reference being made to the accompanying drawing in which the one and only FIGURE shows an example of embodiment of a multiple-battery generator according to the invention.

The generator according to the invention, such as illustrated in the FIGURE comprises a plurality of thermal batteries $P_1, P_2, \ldots P_i, \ldots P_n$ of the type described hereinabove. Each of said batteries comprises a casing 1, made of a conducting material and connected to the cathode 20, an anode 2 and an ignitor (or activator) 3.

In the illustrated example:

all the casings 1 are earth-connected;

all the anodes 2 are connected to the corresponding terminal of a utilization apparatus 4 whose opposite terminal is earth-connected;

all the ignitors 3 are connected, on one side, to a control device constituted either of a battery 14 and switch 5, or of a piezoelectrical system;

the opposite side of the ignitor 3 of battery $P_1$ is connected to casing 1 of said battery $P_1$, by way of a contact 6; and the opposite side of ignitor 3 of batteries $P_2, P_3, \ldots P_i, \ldots P_n$ is connected to a contact 7, said contacts 7 being respectively pressed in against the casing 1 of batteries $P_1, P_2, \ldots P_{i-1}, \ldots P_{n-1}$, with interposition of a layer of electrically-insulating material 8.

As soon as switch 5 is closed, ignitor 3 of battery $P_1$ is supplied through contact 6 and casing 1 of said battery. As a result, battery $P_1$ is activated and begins to deliver its power to the utilization apparatus 4.

For the remaining part of the operation, the device illustrated in the figure may work differently, depending on the nature of the batteries $P_i$, of the insulating material 8 and of the utilization apparatus 4.

In the case where apparatus 4 has to be supplied under a power equivalent to that of each one of the elementary batteries $P_i$ for a period which is a multiple of the working period of one of them, then the material 8 and the position on casings 1 of the switches 7,8 are every time selected so that the switch 7,8 of a battery $P_{i-1}$ works just before that moment when said battery $P_{i-1}$, being activated, stops its delivery of power to apparatus 4, so that the ignitor 3 of the next battery $P_i$ is then being actuated via switch 7,8 and casing 1 of the preceding battery $P_{i-1}$.

If apparatus 4 requires a power which is n times the power of an elementary battery $P_i$, thermal switches 7,8 are then arranged so that the n batteries $P_i$ are activated simultaneously, in other words, so that all the switches 7,8 reach immediately their working temperature and transmit the activation signal from battery $P_2$ towards battery $P_n$.

According to another type of operation, the utilization apparatus 4 may require working periods between which about one second to even ten years may elapse, each working period being delimited by first the closure, then the opening of switch 5. Inside each of said working periods, it is possible, in the manner described hereinabove, to activate one or more batteries $P_i$ either successively or simultaneously.

Obviously the invention is not limited to the modes of operation described hereinabove and on the contrary, others may be obtained by adapting and arranging switches 7,8 and/or controlling switch 5.

It must be noted that the power necessary to control ignitors 3 is very low so that the battery 4 which supplies said power (or any other device such as a piezoelectric system) can be some distance away from batteries $P_i$.

Obviously, one or more batteries $P_i$ may be provided with a plurality of thermal switches 7,8 to control the other control and utilization chains.

Although the foregoing describes an essentially electrical control system for ignitors 3, it is obvious that with a contact 7,8, other types of control such as for example electro-mechanical, electro-optical or firing systems, may also be used.

We claim:

1. An electrical device for delivering power to a pair of output terminals, comprising:

a normally inactivated thermal battery;

a normally deenergized activating means which will cause said thermal battery to deliver power to said output terminals when energized;

a means for energizing said activating means;

an electrical circuit to be controlled in relationship with the power delivered by said thermal battery to said output terminals; and a thermal switch electrically disposed in said electrical circuit and in thermal connection with said thermal battery, said thermal switch being able to switch when the temperature of said thermal battery reaches a predetermined value.

2. An electrical device as claimed in claim 1, wherein said thermal switch is mounted on a casing of said battery and is thermally connected therewith.

3. An electrical device as claimed in claim 2, designed to control an electrical circuit via said thermal switch, wherein said casing of the battery is at least partly electrically conducting and forms part of the electrical circuit controlled by said thermal switch.

4. An electrical device as claimed in claim 3, wherein said switch comprises an electrically conducting movable arm which is pressed in towards said casing of said battery but electrically separated therefrom by an insulating material, which can, either be eliminated by melting, or become conducting, in responce to an increase in the temperature of the portion of casing with which it is in contact.

5. An electrical device as claimed in claim 4, wherein, depending on the response temperature required for the thermal switch, said insulating material is as follows:

up to 70° C.: paraffins, stearins
    between 70° C. and 100° C.: polyethylene
    between 100° C. and 160° C.: polyurethane
    between 160° C. and 210° C.: anthracenes
    between 210° C. and 240° C.: polycarbonates
    between 240° C. and 270° C.: polyoxyphenylenes.

6. An electrical device for delivering power to a pair of output terminals, comprising:

a series of normally inactivated thermal batteries;

a means for connecting all of said batteries in parallel between said output terminals;

normally deenergized activating means for each of said batteries which will cause its associated battery to deliver power to said output terminals when energized;

a means for energizing said activating means;

a thermal switching means for each of said batteries preceding the last battery in said series, each thermal switching means being in thermal connection with its associated battery and being able to switch when temperature of said associated battery reaches a predetermined value;

the activating means for the first of said batteries in said series being directly connected to said energizing means; and the activiating means for the second to the last of said batteries in said series being connected to said energizing means through said thermal switching means associated with the preceding battery in said series.

* * * * *